Patented Mar. 6, 1934

1,949,434

UNITED STATES PATENT OFFICE 1,949,434

DERIVATIVE OF CELLULOSE COMPOSITION AND METHOD OF PREPARING THE SAME

George Schneider, Montclair, N. J., assignor to Celanese Corporation of America, a corporation of Delaware No Drawing. Application April 13, 1932, Serial No. 605,123

15 Claims. (Cl. 106—40)

This invention relates to the preparation of compositions adapted to be molded and containing organic derivatives of cellulose and plasticizers in intimate admixture.

An object of my invention is to prepare compositions containing organic derivatives of cellulose and plasticizers in intimate admixture in a very simple and expeditious manner. A further object of my invention is to cause organic derivatives of cellulose more readily to absorb plasticizers from aqueous liquids by the presence of a penetrating agent for the organic derivative of cellulose. Other objects of this invention will appear from the following detailed description.

Molding compositions containing organic derivatives of cellulose and plasticizers have been prepared by various methods, all of which require a more or less complicated or expensive series of steps or the use of volatile solvents or organic liquids to dissolve the organic derivative of cellulose and/or plasticizer in order to obtain the degree of intimate admixture of organic derivative of cellulose and plasticizer required to produce molding compositions capable of forming molded articles having the requisite strength and homogeneity.

I have made the surprising discovery that an intimate mixture or organic derivative of cellulose and plasticizer can be produced in an amazingly simple manner and in a very short period of time, if the organic derivative of cellulose is agitated with a plasticizer in the presence of a penetrating agent for the organic derivative of cellulose and also in the presence of water or other liquid that preferably has no solvent action on either the organic derivative of cellulose or plasticizer. The presence of the penetrating agent causes the organic derivative of cellulose to absorb the plasticizer in a short period of time to form a composition that may be molded under heat and pressure to produce any desired articles.

In accordance with my invention, I prepare a composition adapted to be molded by agitating the organic derivative of cellulose and plasticizer in the presence of a liquid that preferably has no solvent action on the same and in the presence of a penetrating agent for the organic derivative of cellulose, and then removing the liquid from the product thus formed.

While this invention is particularly applicable in connection with compositions comprising cellulose acetate, it may be used with other derivatives of cellulose such as nitro cellulose and other organic derivatives of cellulose such as cellulose formate, cellulose propionate, cellulose butyrate and cellulose ethers such as ethyl cellulose, methyl celulose and benzyl cellulose. This invention will be described more specifically in connection with cellulose acetate, and while the acetone-soluble cellulose acetate will generally be employed because of its commercial availability, cellulose acetate of other solubility characteristics may be used therein.

The cellulose acetate or other organic derivative of cellulose used as the starting material may be in any suitable form such as fibres, grains, granules, powder or in any other desired form. If desired, the cellulose acetate in solution in a suitable solvent may be filtered in order to increase the clarity thereof, and this solution may either be the primary solution of the cellulose acetate formed during acetylation or it may be a solution of cellulose acetate in acetone or other suitable solvent. After filtration, the cellulose acetate may be precipitated by the addition of water or other non-solvent diluent.

The plasticizers employed may be any suitable ones, examples of which in the case of cellulose acetate being ethyl paratoluene sulfonamid, monomethyl xylene sulfonamid, dimethyl phthalate, diethyl phthalate, triphenyl phosphate, dibutyl tartrate, or mixtures of two or more of these. The amount of plasticizer used depends on the characteristics of the molded product desired, and generally will be from 30 to 100% of the weight of the cellulose acetate, the more plasticizer employed the softer the product formed. The plasticizer employed is preferably not soluble in water in the case where water is used as the non-solvent medium or vehicle in the process.

The plasticizer may be added to the cellulose acetate and water or other non-solvent vehicle in any suitable manner. Thus the plasticizer may be added with stirring to the cellulose acetate and water in a form of an emulsion or colloidal solution in water or aqueous liquid. If the plasticizer is a liquid at ordinary temperatures it may be added as such, and if it is a solid it is preferably added while in molten condition.

As stated, in order to increase the rate of absorption of the plasticizer by the cellulose acetate and in order to obtain a greater and better degree of absorption, there are present penetrating agents for the cellulose acetate or other organic derivative of cellulose. These penetrating agents are organic compounds which render the organic derivative of cellulose in such a form that the plasticizer can more readily penetrate in and be absorbed by the organic derivative of cellulose particles.

Any suitable penetrating agent may be employed. Examples of penetrating agents to be employed in this process in connection with cellulose acetate are Turkey red oil, xylene, toluene, monopol oil, pine oil, sulfonated pine oil, cyclohexanol, cyclohexanone, diacetin, tetralin, or mixtures of two or more of these materials. Examples of such mixtures are a mixture of Turkey red oil and xylene, a mixture of Turkey red oil, tetralin and sodium silicate, and a mixture of cyclohexanol, tetralin and soap.

Generally the amount of penetrating agent required is relatively small, say on the order of 0.5 to 5% or more of the weight of the cellulose acetate present. The amount of penetrating agents present should not be so great as to form with the water or other non-solvent liquid present a mixture that is a solvent for either the organic derivative of cellulose or plasticizer. The presence of these penetrating agents decreases the time required for the absorption of the plasticizer by the cellulose acetate enormously, so that in some cases the time required to obtain the necessary degree of absorption of the plasticizer by the organic derivative of cellulose when the penetrating agent is present is on the order of one-tenth of that required in a similar process where no penetrating agent is present.

For reasons of economy, I generally prefer to employ water or other aqueous liquid as the vehicle or bath in which the cellulose acetate and plasticizers are stirred. However the use of other volatile liquids, particularly those that have no solvent action on the organic derivative of cellulose and/or plasticizer is not excluded. The amount of water or other vehicle present is preferably large, say on the order of 4 to 25 times the weight of the cellulose acetate present. While ordinary room temperatures or even temperatures below room temperatures may be employed, I prefer to employ elevated temperatures say from 35 to 100° C. in order to expedite the action. If relatively volatile plasticizers are employed, the temperature of treatment should preferably be reduced in order to avoid loss of plasticizer due to volatilization at more elevated temperatures.

If desired, pigments or filling materials such as silica gel, wood flour, burnt sienna, burnt umbre, lead chromate, titanium oxide, lakes and/or dyes and other effect materials in finely divided form may be added to the cellulose acetate either before, during or after the agitation thereof with the plasticizer in the presence of the penetrating agent and water. This agitation may be carried out in any suitable device such as a mechanical mixer, ball mill, colloid mill, or any other apparatus for causing intimate admixture.

After the cellulose acetate has selectively absorbed the plasticizer to the desired extent, the intimate mixture of cellulose acetate and plasticizer is removed from the water by any suitable means such as settling, filtration, centrifuging or evaporation. For economical reasons I prefer to separate the molding composition from the water by mechanical means and then remove the residual water by evaporation under atmospheric or under reduced pressure.

The cellulose acetate, plasticizer, penetrating agent and water are preferably stirred or agitated as vigorously as possible by any suitable mechanical means. Often it is desirable to agitate the cellulose acetate with water for a period of time to reduce the size thereof before the addition of the plasticizer, but this is not absolutely necessary, since generally the agitation or stirring and the absorption of the plasticizer causes the size of the cellulose acetate to be reduced to that of a powder.

As one mode of carrying out the present process, cellulose acetate or other organic derivative of cellulose may first be dissolved in acetone or any other suitable volatile solvent miscible with water, and this solution may then be filtered. To this solution of cellulose acetate in acetone, there is added water or other non-solvent diluent until incipient precipitation takes place, that is until the solution assumes a milky or opalescent color, and then the same is subjected to heating to cause evaporation of the volatile solvent, whereupon the cellulose acetate precipitates in very finely divided form. This method is described more fully in the U. S. application of C. Dreyfus and G. Schneider, Serial No. 567,294, filed October 6, 1931. The evaporation of the acetone is continued until the remaining aqueous liquid is not a solvent for either the cellulose acetate or plasticizer. If the evaporation of the acetone is not continued to completion so that a small amount of acetone remains in the aqueous liquid, this may act as a penetrating agent so that further penetrating agents need not be added. However if desired any of the penetrating agents above described may be added at this stage. Plasticizers are then added with or without pigments or other effect materials, and the mass stirred to cause the cellulose acetate to absorb the plasticizer. The molding composition thus formed may then be separated mechanically or by evaporation from the aqueous liquor.

The molding composition made in accordance with this invention has the cellulose acetate and plasticizer in intimate admixture, the plasticizer being uniformly distributed throughout. The product is free of organic solvents for either the cellulose acetate or plasticizer and therefore is capable of forming molded articles that do not tend to warp. The molding composition made by this invention may be molded under heat and pressure in any suitable manner to form any desired articles such as toilet articles, parts of electric apparatus and indeed for making any articles and for all purposes for which compositions made by previous methods may be used. The molding composition may be molded in ordinary molds under heat and pressure or it may be molded by heating the same until it is plastic and then forcing the material under pressure into a mold or die.

In order further to illustrate my invention, but without being limited, the following specific example is given.

*Example*

100 parts by weight of acetone-soluble cellulose acetate are stirred vigorously with 1,800 parts by weight of water, and thereupon there is added a penetrating agent which consists of 0.5 part of Turkey red oil and 0.5 part of xylene. The stirring is continued for about one hour, whereupon plasticizers, consisting of 50 parts of dimethyl phthalate and 10 parts of triphenyl phosphate, are added. The batch is heated to 60° C., and stirring is continued for 20 to 60 minutes. Thereupon the suspension so formed is run to a setting tank and the molding composition separated from the water, and then dried.

In this manner there is formed an intimate mixture of cellulose acetate and plasticizer having all the desired properties above described.

The foregoing detailed description is given merely by way of illustration and many variations may be made therein without departing from the spirit of my invention.

Having described my invention, what I desire to secure by Letters Patent is:

1. Method of forming compositions containing an organic derivative of cellulose and a plasticizer in intimate admixture comprising causing the organic derivative of cellulose to absorb the plasticizer in the presence of a penetrating agent for the organic derivative of cellulose, while both the organic derivative of cellulose and the plasticizer therefor are in suspension in a liquid.

2. Method of forming compositions containing cellulose acetate and a plasticizer in intimate admixture comprising causing the cellulose acetate to absorb the plasticizer in the presence of a penetrating agent for the cellulose acetate, while both the cellulose acetate and the plasticizer therefor are in suspension in a liquid.

3. Method of forming compositions containing an organic derivative of cellulose and a plasticizer in intimate admixture which comprises causing the organic derivative of cellulose to absorb the plasticizer in the presence of a water-miscible penetrating agent for the organic derivative of cellulose, while both the organic derivative of cellulose and the plasticizer therefor are in suspension in a liquid.

4. Method of forming compositions containing an organic derivative of cellulose and a plasticizer in intimate admixture which comprises causing the organic derivative of cellulose to absorb the plasticizer in the presence of a water-miscible penetrating agent for the organic derivative of cellulose, while both the organic derivative of cellulose and the plasticizer therefor are in suspension in an aqueous liquid.

5. Method of forming compositions containing cellulose acetate and a plasticizer in intimate admixture which comprises causing the cellulose acetate to absorb the plasticizer in the presence of a water-miscible penetrating agent for the cellulose acetate, while both the cellulose acetate and the plasticizer therefor are in suspension in a liquid.

6. Method of forming compositions containing cellulose acetate and a plasticizer in intimate admixture which comprises causing the cellulose acetate to absorb the plasticizer in the presence of a water-miscible penetrating agent for the cellulose acetate, while both the cellulose acetate and the plasticizer therefor are in suspension in an aqueous liquid.

7. Method of forming compositions containing an organic derivative of cellulose and a plasticizer in intimate admixture which comprises causing the organic derivative of cellulose to absorb the plasticizer in the presence of a penetrating agent for the organic derivative of cellulose, while both the organic derivative of cellulose and the plasticizer therefor are in suspension in a liquid which is substantially free from volatile solvent for the organic derivative of cellulose or plasticizer.

8. Method of forming compositions containing cellulose acetate and a plasticizer in intimate admixture which comprises causing the cellulose acetate to absorb the plasticizer in the presence of a penetrating agent for the cellulose acetate, while both the cellulose acetate and the plasticizer therefor are in suspension in a liquid which is substantially free from volatile solvent for the cellulose acetate or plasticizer.

9. Method of forming a composition containing an organic derivative of cellulose and a plasticizer in intimate admixture comprising agitating the organic derivative of cellulose and plasticizer in the presence of a penetrating agent for the organic derivative of cellulose while both the organic derivative of cellulose and the plasticizer therefor are in suspension in a large amount of aqueous liquid whereby the organic derivative of cellulose absorbs the plasticizer, and then separating the aqueous liquid therefrom.

10. Method of forming a composition containing cellulose acetate and a plasticizer in intimate admixture comprising agitating the cellulose acetate and plasticizer in the presence of a penetrating agent for the cellulose acetate while both the cellulose acetate and the plasticizer therefor are suspended in a large amount of aqueous liquid whereby the cellulose acetate absorbs the plasticizer, and then separating the aqueous liquid therefrom.

11. Method of forming a composition containing cellulose acetate and a plasticizer in intimate admixture comprising agitating at elevated temperatures the cellulose acetate and plasticizer in the presence of a penetrating agent for the cellulose acetate while both the cellulose acetate and the plasticizer therefor are suspended in a large amount of aqueous liquid, whereby the cellulose acetate absorbs the plasticizer, and then separating the aqueous liquid therefrom.

12. Method of forming a composition containing cellulose acetate and plasticizer in intimate admixture comprising adding a plasticizer in molten form to cellulose acetate suspended in a large amount of aqueous liquid containing a penetrating agent, agitating the mass, whereby the cellulose acetate selectively absorbs the plasticizer, and then separating the aqueous liquid therefrom.

13. Method of forming a composition adapted to be molded comprising agitating cellulose acetate with a plasticizer while both the cellulose acetate and the plasticizer therefor are suspended in an aqueous liquid containing a penetrating agent for the cellulose acetate selected from the group consisting of Turkey red oil, xylene, pine oil, sulfonated pine oil and cyclohexanol.

14. Method of forming a composition adapted to be molded comprising agitating cellulose acetate with a plasticizer while both the cellulose acetate and the plasticizer therefor are suspended in an aqueous liquid containing a mixture of Turkey red oil and xylene.

15. Method of forming a composition adapted to be molded comprising agitating cellulose acetate with a plasticizer while both the cellulose acetate and the plasticizer therefor are suspended in an aqueous liquid containing a mixture of Turkey red oil and xylene, said mixture being in an amount of 0.5 to 5% of the weight of the cellulose acetate present.

GEORGE SCHNEIDER.